Jan. 3, 1956 G. GOODMAN 2,729,757
FERROELECTRIC CERAMIC COMPOSITION AND METHOD OF MAKING SAME
Filed June 9, 1951
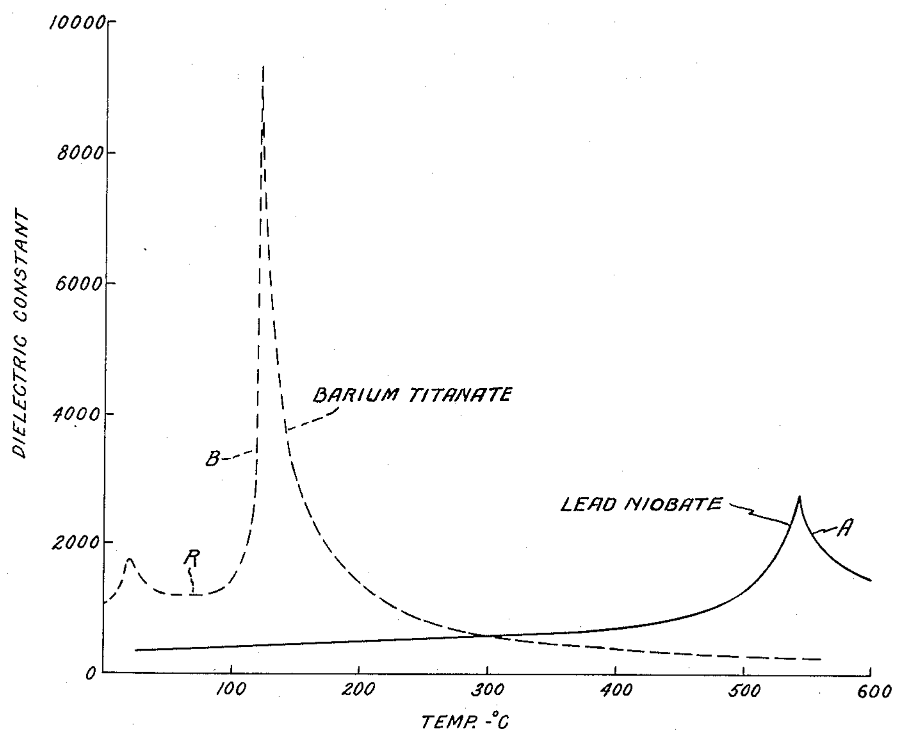
Inventor:
Gilbert Goodman,
by Paul A. Frank
His Attorney.

United States Patent Office 2,729,757

Patented Jan. 3, 1956

2,729,757

FERROELECTRIC CERAMIC COMPOSITION AND METHOD OF MAKING SAME

Gilbert Goodman, Schenectady, N. Y., assignor to General Electric Company, a corporation of New York Application June 9, 1951, Serial No. 230,788

10 Claims. (Cl. 310—8)

My invention relates to polycrystalline dielectric materials, and more particularly to ceramic materials capable of being electrically activated to exhibit remanent piezoelectric properties.

Such activatable polycrystalline dielectric materials have been found to have electric polarization properties analogous to the magnetic polarization properties of ferromagnetic materials and are now generally known as "ferroelectric materials."

One property of these ferroelectric materials is that at a particular temperature, called the "Curie point," there is a definite transformation of the polycrystalline lattice structure. Ferroelectric ceramic materials heretofore known, such as alkaline earth titanates, have the crystalline structure of the Perovskite compounds, and undergo a crystalline structure transition, such as transform from a tetragonal to a cubic structure as the temperature of the ceramic is raised through its Curie point. Once polarized electrically, these materials have remanent piezoelectric properties only while they are maintained in the tetragonal or other crystalline state below this Curie temperature. If the internal temperature of the polarized ferroelectric ceramic is raised above this Curie point, the piezoelectric activation is destroyed, and the material must be re-activated by the application of a polarizing electric field before it will again exhibit remanent piezoelectric properties in its initial crystalline state below the Curie point.

Unfortunately, the Curie point of ferroelectric Perovskite compounds rarely exceeds 120° C. (the Curie point of barium titanate). The utility of these ceramics as piezoelectric elements in various electro-mechanical transducers is thus severely curtailed by this upper temperature limitation. Where ceramic transducers are employed as compressional wave generators, for example, the maximum power output obtainable is often limited by the resultant temperature rise in the transducer. Moreover, it is often desired to employ ceramic transducers to sense mechanical vibration in locations, such as on jet engines, that have temperatures far above 120° C.

Accordingly, a principal object of my invention is to provide new polycrystalline dielectric materials in the form of a ceramic having transition temperatures much higher than Perovskite ferroelectric compounds. The ferroelectric ceramic materials of my invention have a Curie point in the neighborhood of 540° C.

Another object of my invention is to provide a ceramic material polarized to exhibit remanent piezoelectric properties over a wide range of temperatures up to 540° C.

An additional object of my invention is to provide a dielectric material having a moderately high and fairly constant dielectric constant over a wide temperature range from normal room temperature up to temperatures of the order of 500° C.

A further object of my invention is to provide a ceramic transducer suitable for use in temperatures approaching 540° C.

A still further object of my invention is to provide new methods of making and polarizing the ferroelectric ceramic compositions of my invention.

In accord with my invention, I have produced non-Perovskite ceramic compositions which are ferroelectric and may be activated to exhibit remanent piezoelectric properties. The compositions of my invention comprise polycrystalline aggregates formed by vitrified combinations of lead oxide and niobium pentoxide having a generalized formula $(PbO)_x \cdot Nb_2O_5$, where $x$ is from 0.5 to 1.5, and preferably about 1.0. In accord with this formula the ratio of lead to niobium lies between 0.25 and 0.75 and is preferably about 0.50. These ceramic combinations, which may be termed lead niobates, have a Curie point in the neighborhood of 540° C. and have a fairly high and flat dielectric constant from room temperature up to 500° C. as well as a moderately high piezoelectric constant about one-third that of barium titanate.

Lead niobate is the only niobate having these desirable properties. Although I have found that certain barium niobate compositions are also ferroelectric, they do not have such desirable properties as the lead niobates, having a Curie point in the neighborhood of 200° C. and a considerably lower dielectric and piezoelectric constant than the lead niobates.

In practice, it has been found advantageous to introduce a fluxing material in the form of zirconium dioxide or titanium dioxide in amounts up to 17 per cent by weight of the total lead niobate content. The addition of this fluxing material aids in the achievement of dense, nonporous, vitrified, ceramic material, and thus improves the dielectric strength of the material.

For a better understanding of my invention, reference is made to the following detailed description taken in connection with the accompanying drawing in which Fig. 1 illustrates a typical curve of dielectric constant v. temperature for the compositions of my invention as compared with a corresponding curve for barium titanate.

The lead niobate ceramic is produced by a vitrified combination of lead oxide, PbO, and niobium pentoxide, $Nb_2O_5$. I have found, however, that it is virtually impossible to employ lead oxide, PbO, as the raw material because PbO melts at 888° C. and the lead vaporizes or runs off before the lead oxide-niobium penoxide interaction can occur at the much higher vitrification temperatures. By employing lead sulphate, $PbSO_4$, as the raw material in the manner hereinafter described, little lead loss results.

The raw materials employed are lead sulphate, niobium pentoxide and preferably a small amount of zirconium (or titanium) dioxide. The proportion of lead sulphate to niobium pentoxide is such that from 0.5 to 1.5 mols of lead oxide are available for reaction for each mol of niobium pentoxide present. The amount of zirconium dioxide added is preferably a small percentage but may be up to 14.4%, by weight, of the total resulting composition, or, in other words, up to 17% of the lead niobate content.

The preferred proportion of these materials, by weight, is in the neighborhood of 53.96% $PbSO_4$; 44.94% niobium pentoxide, and 1.10% zirconium dioxide which provides 50 mol per cent lead oxide, 47.5 mol per cent niobium pentoxide and 2.5 mol per cent zirconium dioxide available for the reaction. With this preferred composition satisfactory ceramic pieces may be prepared with a single firing. Considerable variation in the proportions may be tolerated, however, as exemplified by the following table of a few compositions which have been successfully vitrified and polarized.

| Comp. | Percent by Weight | | | Mol Percent | | | Percent by Weight | | |
|---|---|---|---|---|---|---|---|---|---|
| | $PbSO_4$ | $Nb_2O_5$ | $ZrO_2$ | $PbSO_4$ | $Nb_2O_5$ | $ZrO_2$ | $PbO$ | $Nb_2O_5$ | $ZrO_2$ |
| A | 56.86 | 37.36 | 5.78 | 50.0 | 37.5 | 12.5 | 49.2 | 44.0 | 6.8 |
| B | 46.6 | 40.8 | 12.6 | 37.5 | 37.5 | 25 | 39.1 | 46.5 | 14.4 |
| C | 36.3 | 63.7 | ------- | 33.33 | 66.66 | ------- | 29.6 | 70.4 | ------- |

It is to be noted, as shown by composition C, that the zirconium dioxide is not necessary although improved dielectric properties result from its use. Compositions, such as exemplified by those in the above table, which vary considerably from the preferred composition may often require regrinding, reforming and refiring after the initial firing before satisfactory ceramic pieces are produced.

The raw materials are prepared for firing in accordance with usual ceramic techniques. Materials are first mixed together in a liquid such as acetone or amyl acetate in which the materials are not soluble. The mixture is then dried and pulverized such as by ball milling into a fine powder so that the coarsest particles will pass a 100 mesh screen. Where small pieces having a thickness less than 0.25 inch are desired, the powder may then be merely pressed into the desired shape under a pressure of approximately 10 tons per square inch. For larger pieces a binder or plasticizer should be used such as, for example, a ten per cent solution of polyvinyl alcohol in water used to the extent of five per cent of dry powder. Instead of dry pressing as described above, the ceramic may be prepared for firing by extrusion or casting in accord with conventional techniques.

The formed lead sulfate-niobium pentoxide body is then subjected to very rapid firing at a temperature between 1250 and 1325° C. and preferably around 1300° C. Little or no vitrification occurs below 1250° and the composition melts above 1325° C. The rapid firing is achieved by introducing the formed pellet directly into the hot zone of a furnace operating at 1300° C., holding the pellet at that temperature for a duration of the order of 45 minutes and withdrawing it slowly in order to prevent breakage due to thermal shock. This rapid firing technique is necessary in order to raise the formed material rapidly from the decomposition temperature of the lead sulphate to the reaction temperature. The lead content is introduced as a sulphate to take advantage of the high (1000° C.) decomposition temperature of lead sulphate. The lead oxide, $PbO$, is thereby made available in a highly reactive state for combination with the niobium pentoxide. The rapid rise in temperature, together with the highly reactive state of the lead oxide, produces a lead oxide-niobium pentoxide interaction with little opportunity for lead loss by running off or vaporization of the molten lead oxide. Only about one to two per cent of the theoretical lead oxide content is lost in the process. The firing must, however, be carried out in an oxidizing atmosphere such as provided by any air furnace. This is to prevent the reduction of the lead niobate which occurs if there is an insufficiency of oxygen present.

After cooling, the lead niobate ceramic may be piezoelectrically activated by applying a unidirectional polarizing field of at least 15 volts per mil thickness through the ceramic piece while it is maintained at a temperature within the range of 150° C. to 350° C. for a duration of at least one-half hour. Desirable conditions for piezoelectric activation are a polarizing field of 19 volts per mil thickness at 250° C. for two and one-half hours. Activation by applying the polarizing field while the ceramic is cooled through its Curie temperature in the manner often employed with barium titanate is impractical with the ceramics of my invention because of the too low electrical resistivity of lead niobate ceramics at the high Curie point (540° C.). Activation at room temperature is also impractical because the very strong polarizing fields necessary at room temperature cause breakdown of the lead niobate ceramic.

In making a transducer, it is preferable to activate the lead niobate ceramic by applying the polarizing voltage to electrodes previously deposited upon opposite major faces of the ceramic piece. Pure gold or silver, vacuum deposited on the faces of the ceramic, has been found to make satisfactory electrodes. These activating electrodes thereafter also function as the electrodes for the transducer. Commercial silvering preparations adapted to be fired onto the surface of the ceramic are unsuitable at the activation temperatures used. In order to prevent arcing, the ceramic piece is preferably immersed in a silicone (polysiloxane) oil while it is maintained at the activation temperature.

The measured piezoelectric constant of lead niobates of my invention, activated as described above, is in the neighborhood of $5\times10^{-11}$ coulombs per Newton at room temperature. In other words, $5\times10^{-11}$ coulombs of electrical charge are produced by the ceramic body when subjected to a compressive force of one kilogram weight. The remanent piezoelectric properties of the polarized lead niobate ceramics appear to be retained indefinitely as long as the 540° C. Curie temperature of the material is not exceeded. Moreover, changes in temperature below 540° C. appear to have little effect upon the piezoelectric constant value. Polarized lead niobate pieces heated in one-half hour to 535° C. showed no change in piezoelectric constant when returned to room temperature.

Referring to Fig. 1, there is shown a typical curve A of dielectric constant versus temperature for lead niobate ceramic compositions of my invention. As can be seen from curve A, the ceramics have a moderately high and only gradually increasing dielectric constant from room temperature up to approximately 500° C. Because of its substantially flat dielectric constant characteristic over this wide temperature range, these niobate ceramic compositions are particularly suitable for use in transducers, insulators or capacitors where a substantially uniform electrical impedance characteristic without major fluctuations is desired over the temperature range involved. The wide range of substantially flat dielectric constant versus temperature characteristic of the niobate compositions of my invention is more clearly appreciated when compared with the very narrow range R of flat dielectric constant versus temperature characteristic of the alkaline earth metal titanates illustrated by the typical dashed curve B. The maximum dielectric constant points on the curves coincide with the Curie points of the respective materials.

From the foregoing it will be seen that the present invention provides new ferroelectric compositions suitable as dielectric materials or as piezoelectric materials in a wide variety of uses. The above specific examples of compositions have been set forth as illustrative of the invention, it being understood that various modifications can be made within the true spirit and scope of my invention. For example, equivalent (mol per cent) quantities of titanium dioxide can be substituted for the zirconium dioxide fluxing agent without materially changing the ferroelectric properties of the lead niobates.

What I claim as new and desire to secure by Letters Patent of the United States is:

1. A ferroelectric material consisting essentially of a vitrified combination of PbO and $Nb_2O_5$ in which the molar ratio of lead to niobium content is between 0.25 and 0.75 to 1.

2. A ferroelectric ceramic material consisting essentially of an electrically polarized polycrystalline aggregate of a vitrified combination of PbO and $Nb_2O_5$ in which the molar ratio of lead to niobium content is between 0.25 and 0.75 to 1.

3. A piezoelectric ceramic consisting essentially of a vitrified combination of PbO and $Nb_2O_5$ in which the molar ratio of lead to niobium is about 0.50 to 1.

4. A dielectric material having ferroelectric properties and having only a gradually rising dielectric constant from room temperature up to 500° C. consisting essentially of a vitrified combination of PbO, $Nb_2O_5$ and a flux selected from the group consisting of $TiO_2$ and $ZrO_2$ in which the molar ratio of lead to niobium is between 0.25 and 0.75 to 1 and the flux is present in amounts less than 17 per cent by weight of the combined PbO and $Nb_2O_5$.

5. The dielectric material of claim 4 in an electrically polarized state and having remanent piezoelectric properties at temperatures below 540° C.

6. A ferroelectric ceramic composition consisting essentially of a vitrified combination of PbO, $Nb_2O_5$ and a flux selected from the group consisting of $TiO_2$ and $ZrO_2$ in substantially a 50 to 47.5 to 2.5 mol per cent relation, respectively.

7. A ferroelectric material having a substantially flat dielectric constant versus temperature characteristic up to 500° C. consisting essentially of a vitrified combination of PbO, $Nb_2O_5$ and $TiO_2$ in which the molar ratio of lead to niobium is between 0.25 and 0.75 to 1 and the titanium dioxide is present in amounts less than 17 per cent by weight.

8. A ferroelectric material consisting essentially of a vitrified combination of PbO, $Nb_2O_5$ and $ZrO_2$ in which the molar ratio of lead to niobium content is about 0.50 to 1, the zirconium dioxide being present in amounts less than 17 per cent by weight of the combined PbO and $Nb_2O_5$ and said combination being electrically polarized to exhibit remanent piezoelectric properties.

9. A transducer comprising a coherent fired body of piezoelectric ceramic consisting essentially of a combination of PbO and $Nb_2O_5$ in which the molar ratio of lead to niobium is between 0.25 and 0.75 to 1, said body having electrodes on opposing surfaces thereof.

10. The method of producing a lead niobate ceramic comprising producing a formed mixture of lead sulfate and niobium pentoxide in which the molar ratio of lead to niobium is between 0.25 and 0.75 to 1, and subjecting the formed mixture without previous heating to a firing temperature between 1250° and 1350° C. to decompose the lead sulfate to PbO and to cause vitrification of the resulting lead oxide and niobium pentoxide.

References Cited in the file of this patent

UNITED STATES PATENTS

| | | |
|---|---|---|
| 2,486,560 | Gray | Nov. 1, 1949 |
| 2,538,554 | Cherry | Jan. 16, 1951 |
| 2,584,324 | Bousky | Feb. 5, 1952 |
| 2,598,707 | Matthias | June 3, 1952 |

OTHER REFERENCES

Sue: "Compt. Rend.," vol. 202, pages 486–488 (1936) cited from Chem. Abstracts, vol. 30, col. 2129.

Mellor: "Comp. Treatise on Inorg. and Theoretical Chemistry," vol. 9, pages 867–869 (1929).